(12) United States Patent
Bauer et al.

(10) Patent No.: US 10,451,137 B2
(45) Date of Patent: Oct. 22, 2019

(54) GAS CYLINDER, IN PARTICULAR HIGH-PRESSURE GAS CYLINDER

(71) Applicant: HYDAC TECHNOLOGY GMBH, Sulzbach/Saar (DE)

(72) Inventors: Frank Bauer, Marpingen (DE); Daniel Feld, Saarbrücken (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 456 days.

(21) Appl. No.: 13/261,847

(22) PCT Filed: Oct. 31, 2012

(86) PCT No.: PCT/EP2012/004564
§ 371 (c)(1),
(2) Date: Apr. 23, 2014

(87) PCT Pub. No.: WO2013/072019
PCT Pub. Date: May 23, 2013

(65) Prior Publication Data
US 2014/0230645 A1     Aug. 21, 2014

(30) Foreign Application Priority Data

Nov. 14, 2011 (DE) .......................... 10 2011 119 011

(51) Int. Cl.
*F16F 9/36* (2006.01)
*F16J 15/40* (2006.01)
(Continued)

(52) U.S. Cl.
CPC ................ *F16F 9/365* (2013.01); *F15B 1/24* (2013.01); *F15B 15/1461* (2013.01);
(Continued)

(58) Field of Classification Search
CPC ........ F15B 15/1461; F16F 9/365; F16F 9/362; F16F 9/363; F16F 9/432; F16F 9/0209; F16J 15/40; F16J 15/48; F16J 15/324
See application file for complete search history.

(56) References Cited

U.S. PATENT DOCUMENTS 274,500 A * 3/1883 Kline .................... F25B 31/002
                                                      277/516
719,460 A * 2/1903 Goosmann ............... F16J 15/40
                                                      277/513
(Continued)

FOREIGN PATENT DOCUMENTS

DE      86 160 A      4/1896
DE      869585   *    3/1953
(Continued)

OTHER PUBLICATIONS

Translation of DE869585 from espacenet.*
(Continued)

*Primary Examiner* — Thomas E Lazo
*Assistant Examiner* — Michael Quandt
(74) *Attorney, Agent, or Firm* — Wenderoth, Lind & Ponack, L.L.P.

(57) ABSTRACT

A gas cylinder, in particular a high-pressure gas cylinder, includes a cylinder tube (1) having a piston rod (9) that is passed through a sealing arrangement (13) by which the gas pressure prevailing in the pressure chamber (23) of the cylinder tube (1) is sealed off against the ambient pressure. The sealing arrangement (13) has a compressed oil chamber (33) between a sealing element (31) adjacent to the pressure chamber (23) and another sealing element further away from the pressure chamber (23). Oil can be pressed in the oil chamber by a supply device (51) at a pressure that is equal (Continued)

to or higher than the respective gas pressure prevailing in the pressure chamber (23) of the cylinder tube (1).

20 Claims, 11 Drawing Sheets

(51) Int. Cl.
  *F16J 15/46* (2006.01)
  *F15B 15/14* (2006.01)
  *F16F 9/02* (2006.01)
  *F15B 1/24* (2006.01)

(52) U.S. Cl.
  CPC .............. *F16F 9/0209* (2013.01); *F16J 15/40* (2013.01); *F16J 15/46* (2013.01); *F16F 9/0236* (2013.01)

(56) References Cited

U.S. PATENT DOCUMENTS

| | | | | |
|---|---|---|---|---|
| 2,111,792 | A | * | 3/1938 | Laugaudin ............... D04B 9/46 267/64.15 |
| 2,155,628 | A | * | 4/1939 | Williams ................. F16J 15/20 277/513 |
| 2,737,384 | A | * | 3/1956 | Laugaudin ............ F16F 9/0218 188/317 |
| 3,827,700 | A | * | 8/1974 | Kaller ........................ F16J 9/28 277/529 |
| 3,943,717 | A | * | 3/1976 | Schexnayder ......... F16J 15/004 277/513 |
| 5,465,811 | A | * | 11/1995 | Katz ..................... F16F 9/3278 184/24 |
| 5,607,165 | A | * | 3/1997 | Bredemeyer .......... F16J 15/406 277/320 |
| 5,964,454 | A | * | 10/1999 | Volpel ..................... F16F 9/368 188/322.22 |
| 2013/0220749 | A1 | * | 8/2013 | Stammen ................ B66C 23/82 188/269 |

FOREIGN PATENT DOCUMENTS

| | | | |
|---|---|---|---|
| DE | 2 248 156 A1 | | 4/1973 |
| DE | 36 09 189 A1 | | 11/1986 |
| DE | 10 2008 034582 A1 | | 1/2010 |
| DE | 102010049750 | * | 1/2012 |
| FR | 1 391 524 A | | 3/1965 |
| FR | 2582368 | * | 11/1986 |
| JP | S63235770 A | * | 9/1988 |
| WO | WO 2010/079227 A1 | | 7/2010 |

OTHER PUBLICATIONS

FR 2582368 machine translation to English from espacenet. 1986.*
JPS63235770A machine translation to English from espacenet. 1988.*

* cited by examiner

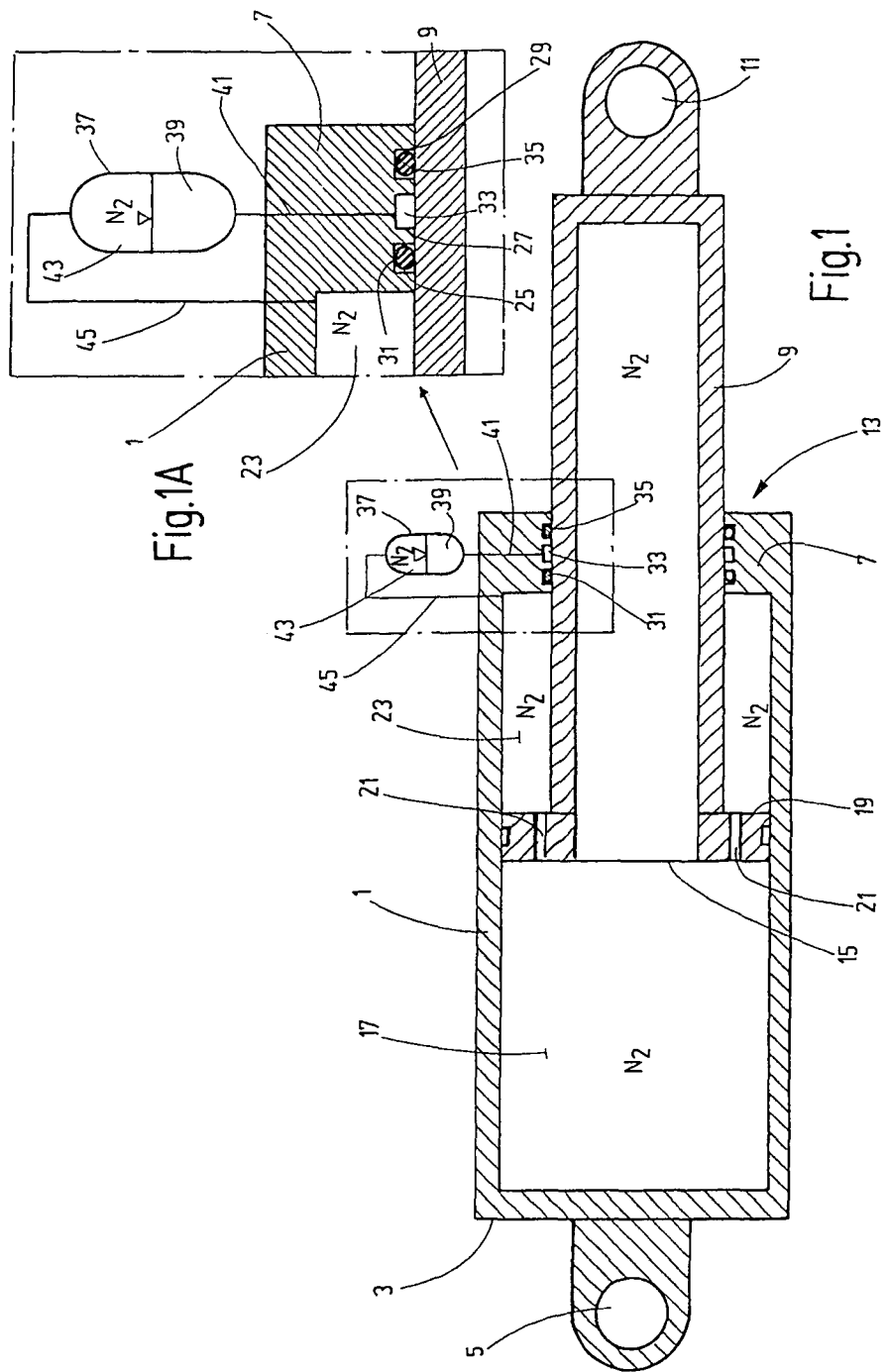

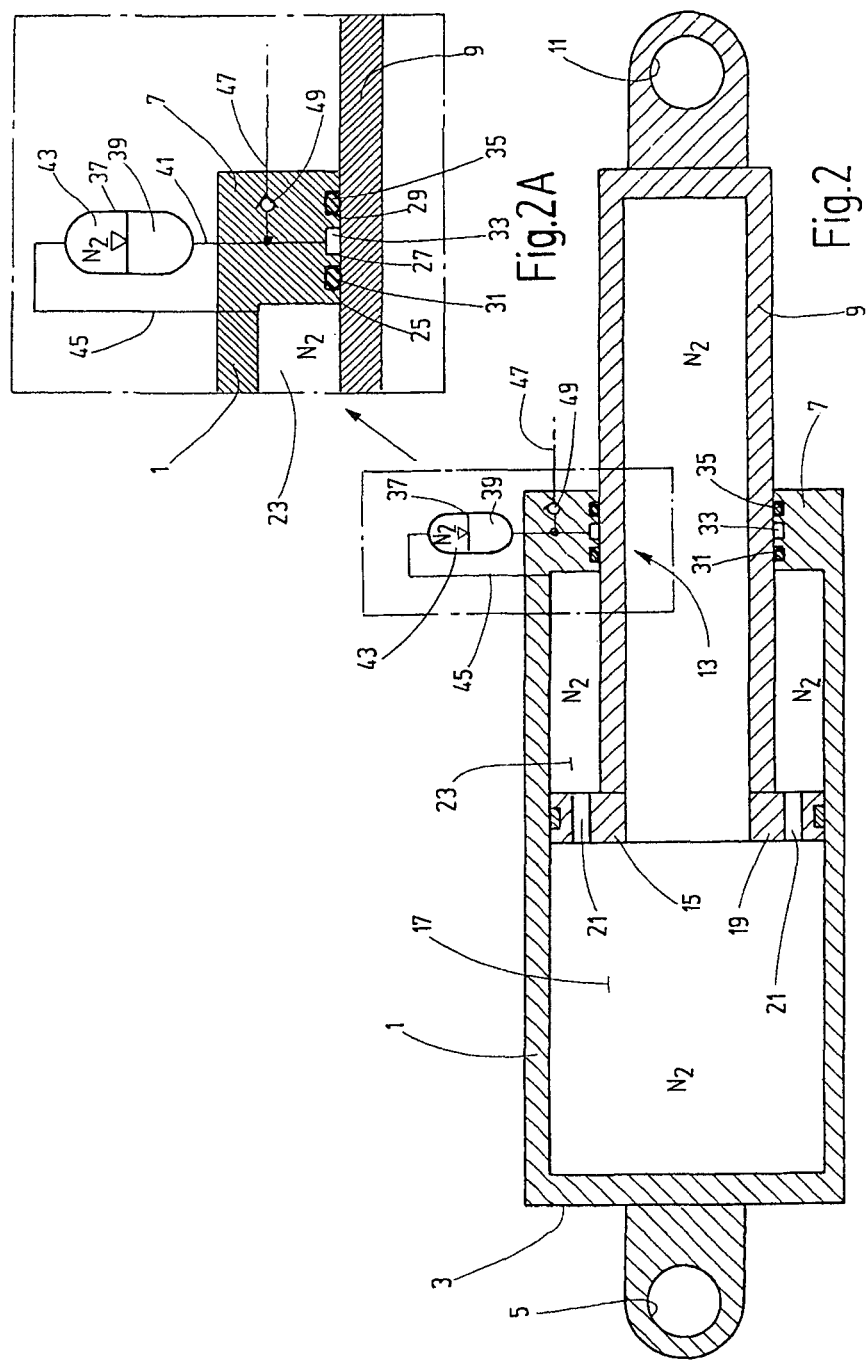

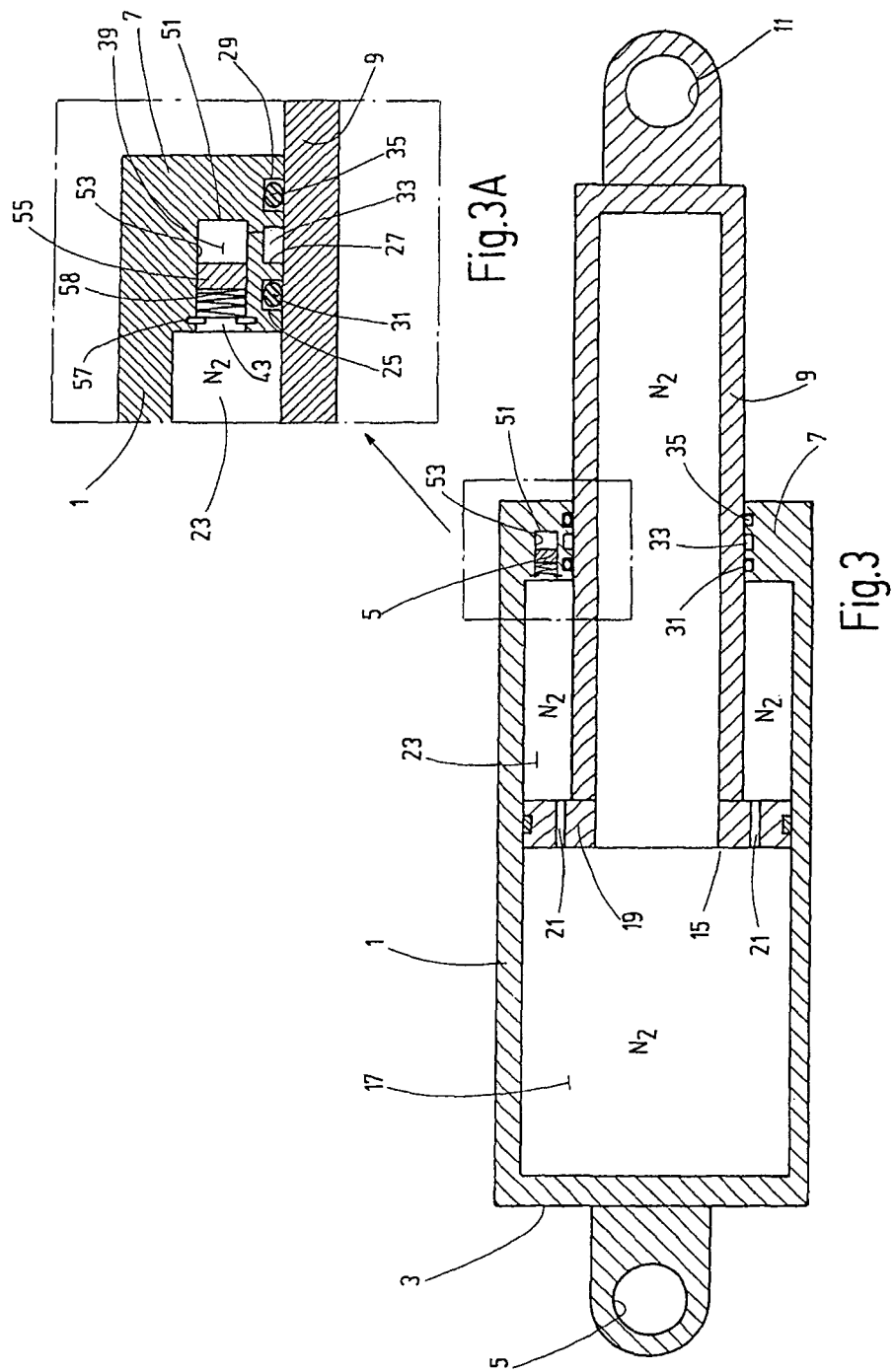

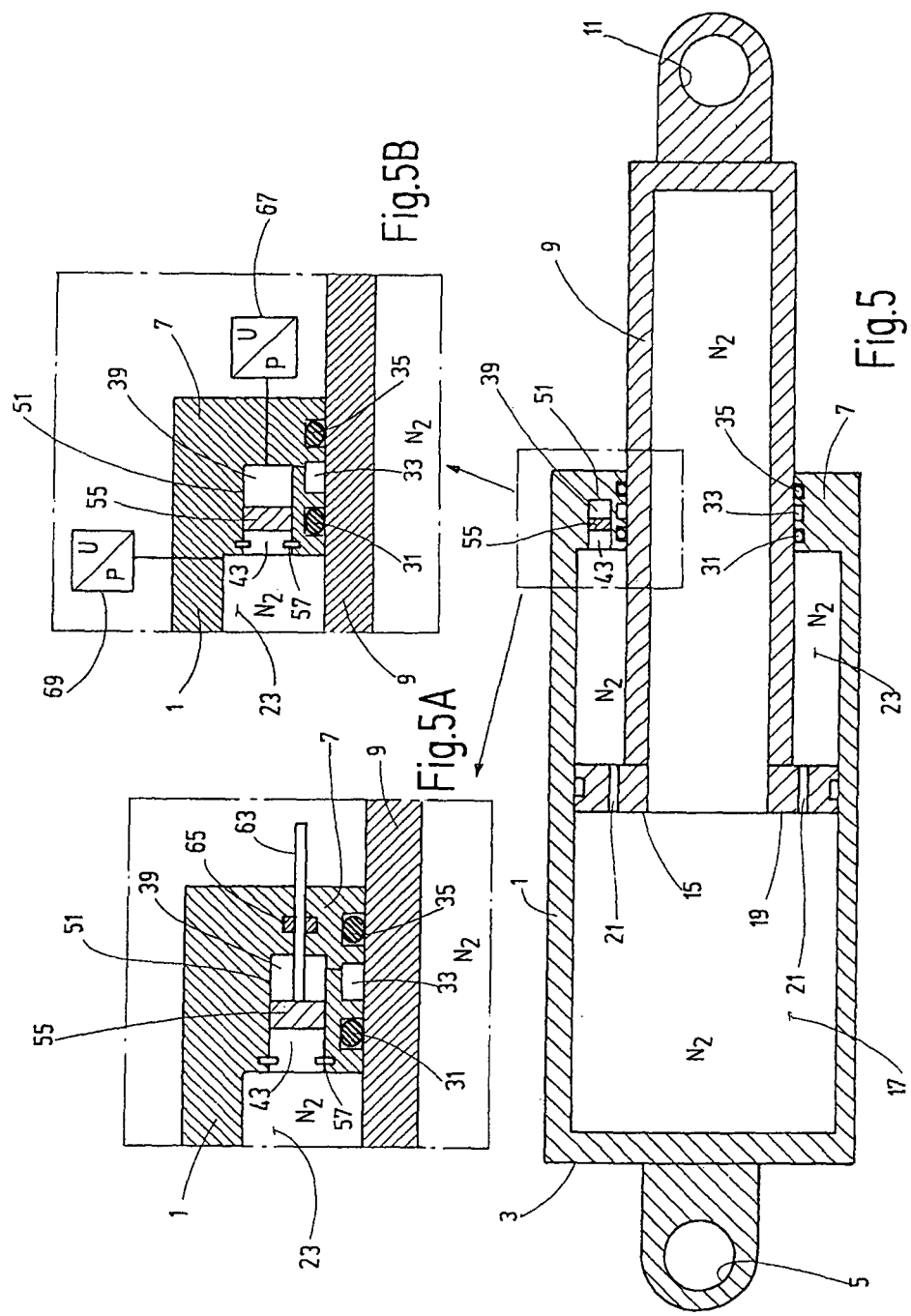

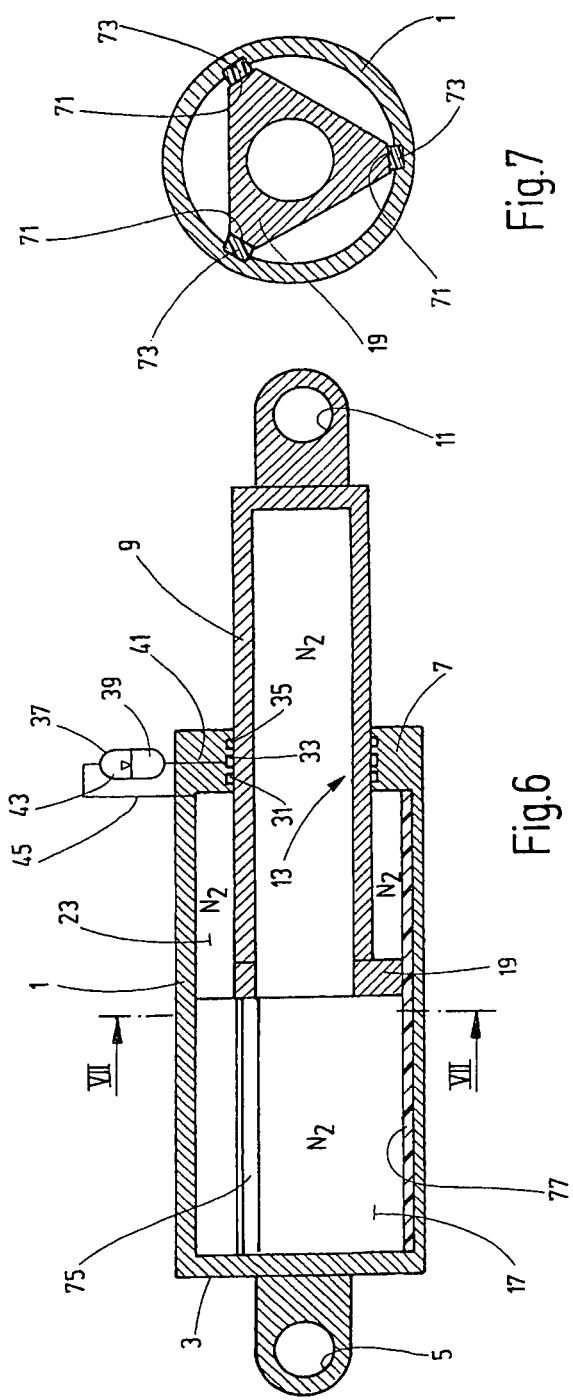

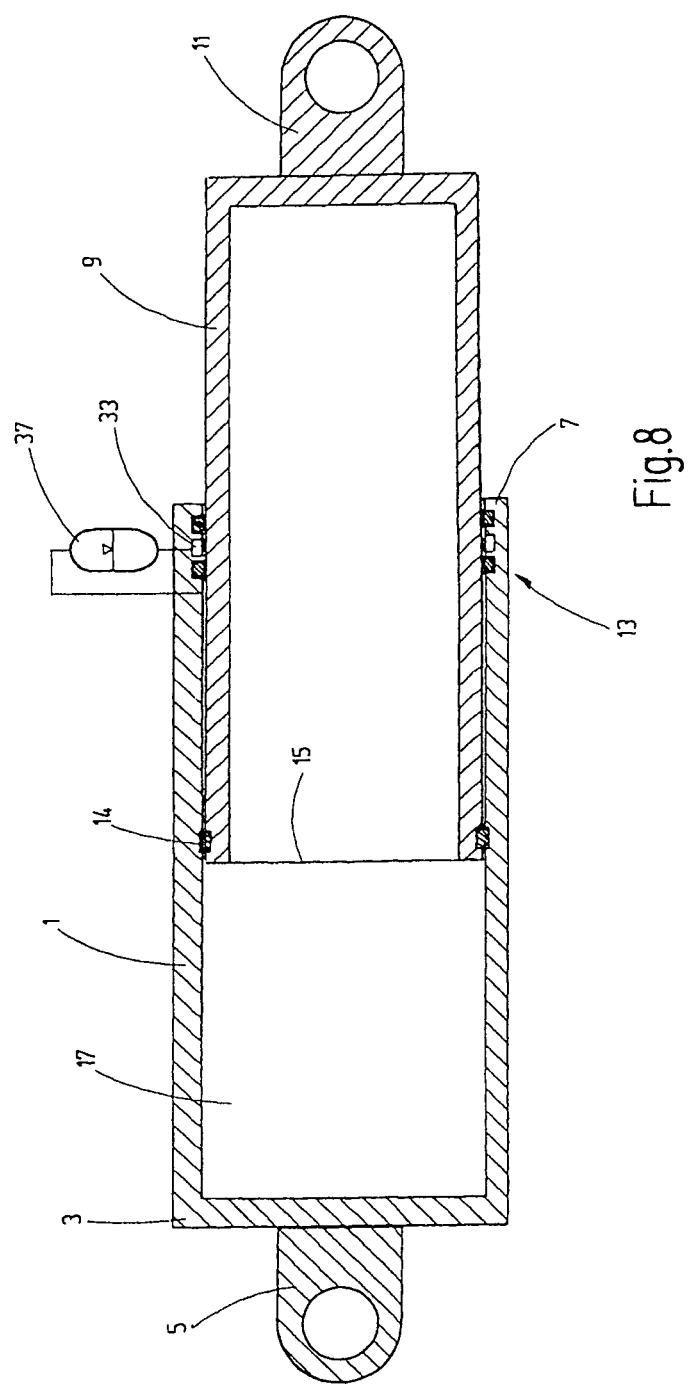

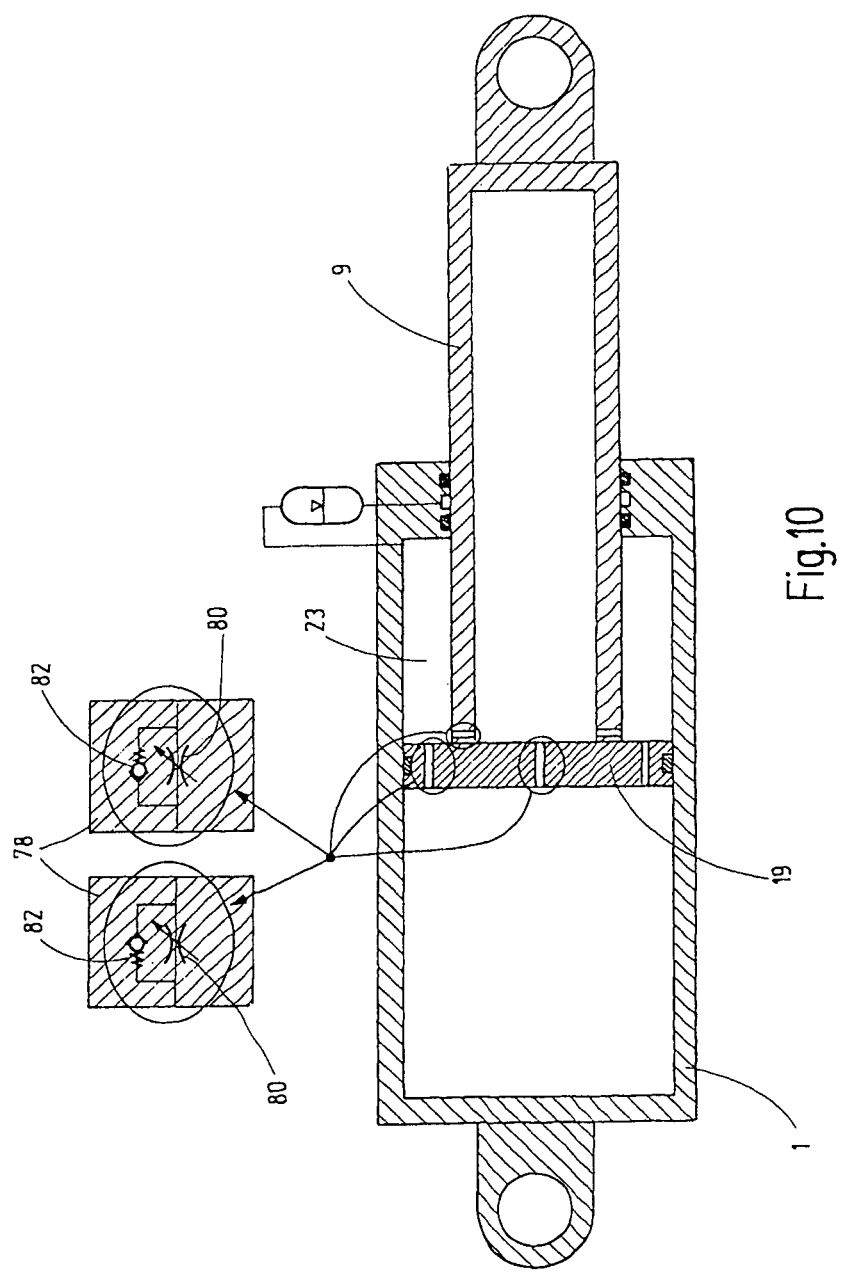

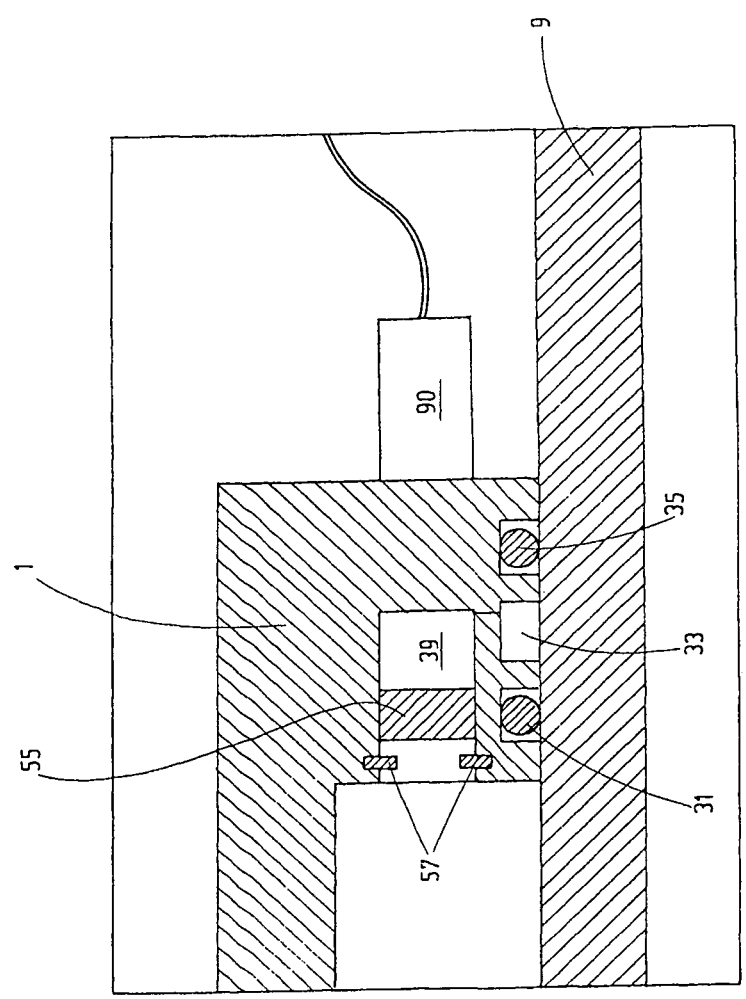

GAS CYLINDER, IN PARTICULAR HIGH-PRESSURE GAS CYLINDER

FIELD OF THE INVENTION

The invention relates to a gas cylinder, in particular a high-pressure gas cylinder. The cylinder tube of the gas cylinder has a piston rod that is passed through a sealing arrangement sealing the gas pressure prevailing in the pressure chamber of the cylinder tube against the ambient pressure.

BACKGROUND OF THE INVENTION

Such gas cylinders, as a kind of plunger cylinder, can be advantageously used as an energy storage cylinder in devices for energy recovery, among other things. As is disclosed by way of example in DE 10 2008 034 582 A1, in such applications, the piston rod of the gas cylinder is connected to a movable element of an associated work tool. The movable element may be the boom of an excavator or of a machine for material handling or the like, for example. When lowering the movable element, the potential energy of the movable element and the load connected thereto is stored by the gas cylinder to provide at least partial compensation for the respective equipment weight when the movable element is raised again.

In the case of the higher pressures prevailing in the pressure chamber during operation, sealing the gas pressure against the ambient air is very difficult, even in the case of a working gas having relatively large molecules such as N2. Preventing gas losses with conventional sealing systems is scarcely possible.

SUMMARY OF THE INVENTION

An object of the invention is to provide an improved gas cylinder that offers increased security against gas losses.

According to the invention, this object is basically achieved by a gas cylinder having, as an essential feature of the invention, a sealing arrangement with multiple sealing elements, which are operationally subordinate to one another. An oil pressure chamber is formed between a sealing element located closer to the pressure chamber and a sealing element located further from the pressure chamber. Oil can be compressed in the oil pressure chamber by a supply device at a pressure that is equal to or higher than the respective gas pressure prevailing in the pressure chamber of the cylinder tube. The sealing element adjacent to the pressure chamber thus does not seal the working gas against the ambient air, but rather against the oil that is at the same pressure level. The high-pressure oil that is located in the oil pressure chamber is sealed against the environment by the additional sealing element. Thus, the sealing objective is divided into two manageable subtasks so that the greatest possible security against gas losses is achieved.

In an especially preferred embodiment of the gas cylinder arrangement according to the invention, the piston rod has a sliding element that can be moved in the cylinder tube. The piston rod is securely guided and supported at two opposing end regions within the cylinder tube. In this way, unimpeded operation is made possible.

In especially advantageous embodiments, the sealing elements of the sealing arrangement and the oil pressure chamber located therebetween are disposed in a fixed positional relationship to one another. This positioning permits realizing the sealing arrangement in its entirety in a uniform component that forms an integral part of the cylinder tube.

Especially advantageously, the supply device for the oil pressure chamber has a hydraulic accumulator. The oil side of the accumulator contains sealing oil and can be connected to the pressurized oil chamber. The gas side of the accumulator can be connected to the pressure chamber of the cylinder tube. The gas pressure in the pressure chamber is thereby utilized in an advantageous manner for the pressure supply of the foil pressure chamber, which leads to an especially simple and reliable structure of the supply device.

In advantageous embodiments, the supply device has an oil connection for refilling the sealing oil to the oil side of the hydraulic accumulator. A device is preferably available for monitoring the quantity of sealing oil during operation. In this regard, at least one pressure sensor may be provided, which signals the oil pressure prevailing in the oil pressure chamber of the sealing arrangement.

The hydraulic accumulator of the supply device can be advantageously designed in the form of a piston accumulator.

The use of a piston accumulator opens up the advantageous possibility of mechanically preloading the piston of the piston accumulator for movement in the direction toward the oil side, for example by a spring arrangement. In the event of gas pressure of the pressure chamber in the cylinder chamber prevailing on the gas side of the piston accumulator, a correspondingly higher pressure level arises in the oil pressure chamber due to the mechanical preloading of the accumulator piston. The sealing element sealing against the gas pressure is then appropriately pressure-supported in an advantageous manner.

In especially advantageous embodiments, the piston accumulator is integrated into the end piece of the cylinder tube containing the sealing arrangement in such a way that the gas side of the accumulator cylinder is open to the pressure chamber of the cylinder tube. The gas cylinder, including the sealing arrangement supported by oil pressure and the associated supply device, thereby forms a closed assembly without external auxiliary units.

The configuration may be advantageously carried out in such a way that the accumulator cylinder is formed in the end piece by an annular space adjacent to the pressure chamber. The annular space encloses the piston rod and contains an annular piston. With the given external dimensions of the cylinder tube and the end piece thereof, a large volume is thereby advantageously available for the piston accumulator, and therefore, a large oil supply for supplying the oil pressure chamber.

On the one hand, a larger volume of gas is available in the case of embodiments in which a hollow piston rod in the form of a straight length of tubing is provided. The inner end of the hollow piston rod is open to the pressure chamber of the cylinder tube. On the other hand, with the given external dimensions and stroke lengths of the cylinder, the total gas volume in the extended position, as well as the change in volume that can be achieved by the displacement movement, can be freely adjusted by the dimensioning of the diameter of the piston rod (inner diameter and outer diameter) and the cylinder tube. The force-stroke characteristic of the gas cylinder can thereby be advantageously influenced.

In especially advantageous embodiments, the sliding element at the end of the piston rod has a piston-shaped guide component. This guide component may have gas outlets, which have a choke effect on displacement movements when outlets are selected that have a small cross section, or which have no choke effect on displacement movements in the case of a large-scale shape. The sliding element then purely fulfills a guiding function on the inside of the cylinder tube.

The guide component may be non-circular, and may be designed in such a way that it is guided along the wall of the cylinder tube only at corner regions. Sliding guides may then be provided at the corner regions and/or on the inner wall.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 1 is a schematically simplified, side view in section of a gas cylinder according to a first exemplary embodiment of the invention;

FIG. 1A is an enlarged, partial side view in section of the region of FIG. 1, marked with a dashed-dotted line;

FIG. 2 is a schematically simplified, side view in section of a gas cylinder according to a second exemplary embodiment of the invention;

FIG. 2A is an enlarged, partial side view in section of the region of FIG. 2, marked with a dashed-dotted line;

FIG. 3 is a schematically simplified, side view in section of a gas cylinder according to a third exemplary embodiment of the invention;

FIG. 3A is an enlarged partial side view in section of the region of FIG. 3, marked with a dashed-dotted line;

FIG. 5 is a schematically simplified, side view in section of a gas cylinder according to a fifth exemplary embodiment of the invention;

FIGS. 5A and 5B are an enlarged side views in section of two alternative embodiments of the region of FIG. 5, marked with a dashed-dotted line;

FIG. 6 is a schematically simplified, side view in section of a gas cylinder according to a sixth exemplary embodiment of the invention;

FIG. 7 is an end view in section taken along line VII-VII of FIG. 6;

FIG. 8 is a schematically simplified, side view in section of a gas cylinder according to a seventh exemplary embodiment of the invention, without a sliding element;

FIG. 10 is a schematically simplified, side view in section of a gas cylinder according to an eighth exemplary embodiment of the invention, in which the sliding element of the piston rod, which is designed as a piston head, has throttle valves and non-return valves to control the fluid; and FIG. 11 is a schematic side view in section of a monitoring device for the piston position of the sealing system, preferably implemented by an ultrasonic sensor.

DETAILED DESCRIPTION OF THE INVENTION

Figure 1B:
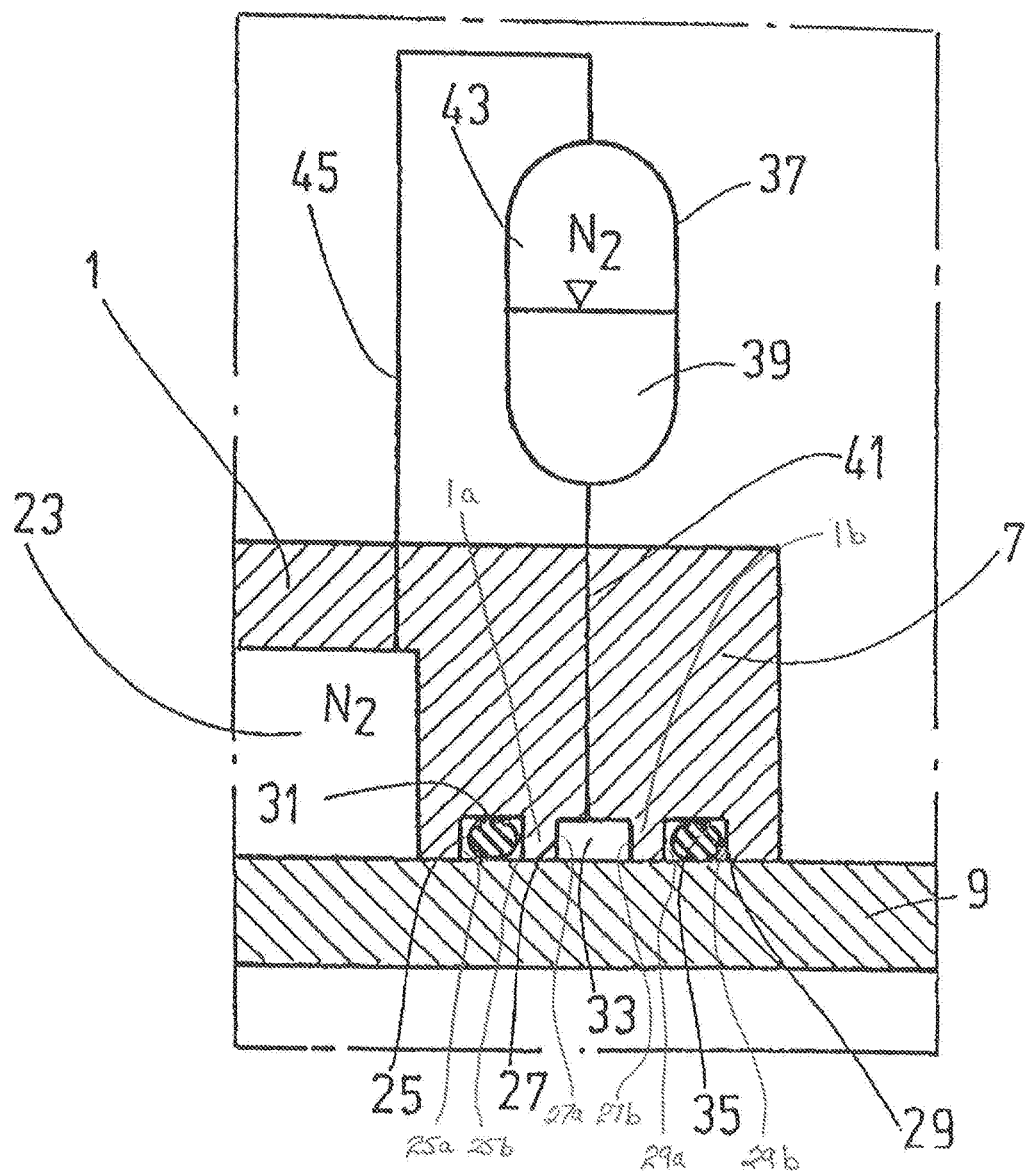
FIG. 1B is further enlarged, partial side view in section of the region of FIG. 1, marked with a dashed-dotted line.

The embodiment shown in FIG. 1 has a cylinder tube 1, at the closed end 3 of which a bearing eye 5 is located. At the opposite end, the cylinder tube 1 has a cylinder end piece 7, which forms a sealed duct for a piston rod 9. At the end of piston rod 9, a bearing eye 11 is located. The piston rod 9 is sealed against the end piece 7 by a sealing arrangement 13. The piston rod 9 has the form of a cylindrical hollow body, so that a tube is formed. The inner end 15 of the tube is open to the pressure chamber 17 of the cylinder tube 1. The pressure chamber 17 is filled with a high-pressure working gas such as N2 (via a filling connector, which is not shown). A piston-shaped guide component 19 is located at the open end 15 of the piston rod 9, with the guide component being guided along the inner wall of the cylinder tube 1 when the piston rod 9 is moved. Ducts 21 are located in the guide component 19, which connect the pressure chamber 17 to the annular space 23 surrounding the piston rod 9 as a partial volume of the pressure chamber 17. The tube that forms the inside of the piston rod 9 is available as an additional partial volume.

As can clearly be seen in the partial section of FIG. 1A, the sealing arrangement 13 comprises several components. To this end, three annular grooves 25, 27 and 29 are formed in the end piece 7, offset or axially spaced from one another, which encircle the piston rod 9. A first sealing element 31 is located in the annular groove 25 nearest to the annular space 23. The subsequent annular groove 27 in the axial direction forms an oil pressure chamber 33. A second sealing element 35 is located in the annular groove 29 located furthest away from the annular space 23. The offsetting or axial spacing of these three annular grooves results in the sealing elements 31, 35 and the pressure chamber 33 being separated from one another.

Specifically, as shown in FIG. 1B, first annular groove 25 has first and second end surfaces 25a, 25b, second annular groove 29 has first and second end surfaces 29a, 29b, and third annular groove 27 has first and second end surfaces 27a, 27b. First end surfaces 25a, 27a, 29a are proximate chambers 17, 23, while second end surfaces 25b, 27b, 27c are remote from chambers 17, 23. Each of those end surfaces extend radially relative to the longitudinal axis of cylinder tube 1, with the end surfaces of each annular groove facing one another and defining the respective annular groove therebetween. Second end surface 25b is axially spaced along the cylinder tube longitudinal axis from the first end surface 27a by a first fixed portion 1a of the cylinder tube. Second end surface 27b is axially spaced along the cylinder tube longitudinal axis from first end surface 29a by a second fixed portion 1b of the cylinder tube.

The oil pressure chamber 33 serves to accommodate high-pressure oil, which is pressurized to at least the same degree as the gas pressure prevailing in the cylinder tube 1. In the present case, a supply device in the form of a hydraulic accumulator 37 is provided to supply the oil pressure chamber 33. The oil side 39 of hydraulic accumulator 37 is directly connected to the oil pressure chamber 33 by a connection 41. The gas side 43 of the hydraulic accumulator 37 is connected to the annular space 23 of the cylinder tube 1 by a connection 45. The hydraulic accumulator 37 is preloaded with the gas pressure prevailing in the cylinder tube 1, so that the hydraulic accumulator 37 maintains a corresponding oil pressure in the oil pressure chamber 33. The first sealing element 31 seals the gas against the oil with the balanced pressure prevailing at the sealing element 31, while the outer, second sealing element 35 seals high-pressure oil against the environment. The sealing task is thus divided into two manageable subtasks, thus reducing the risk of gas loss into the environment.

In the further embodiments to be described below, the sealing arrangement 13 may have more than two axial sealing elements that are axially offset to one another, having a corresponding number of oil pressure chambers located between said sealing elements.

FIGS. 2 and 2A show an embodiment, which only differs from that shown in FIGS. 1 and 1A in that an oil connection 47 is provided for the supply device. The supply device is secured by a non-return valve 49, to permit refilling sealing oil on the oil side 39 of the hydraulic accumulator 37 or through the connection 41.

The additional embodiment shown in FIGS. 3 and 3A differs from the preceding examples in that the hydraulic accumulator of the oil-pressure supply device is formed by a piston accumulator 51. This piston accumulator is integrated in the cylinder end piece 7. To this end, a bore 53 is formed in the end piece 7 functioning as an accumulator cylinder. The bore is adjacent to the annular space 23 of the cylinder tube 1. An accumulator piston 55 seals the oil side 39 of the piston accumulator 51, which oil side is connected to the oil pressure chamber 33, opposite the gas side 43, which gas side is immediately adjacent to the annular space 23. A compression spring 58 clamped between a retaining ring 57 and the accumulator piston 55 preloads the accumulator piston 55 in the direction of the oil side 39, so that the oil pressure in the oil pressure chamber 33 is somewhat increased as compared to the gas pressure prevailing in the cylinder tube 1 in a manner that corresponds to the mechanical preloading. The sealing element 31 located closest to the annular space 23 is therefore pressure-supported against the gas pressure, thereby further improving the sealing behavior.

Figure 4:
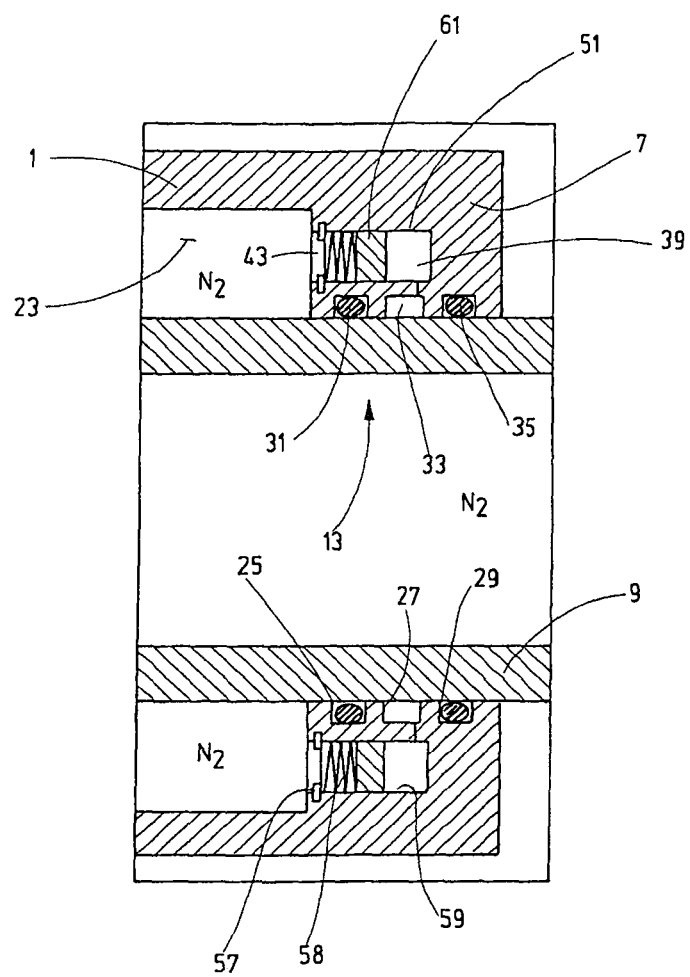
FIG. 4 is a schematically simplified and enlarged partial side view in section of a gas cylinder according to a fourth exemplary embodiment of the invention, showing only the end piece of the cylinder tube having the sealing arrangement.

FIG. 4 shows a variant design of the piston accumulator 51. The accumulator cylinder of FIG. 4 is formed by an annular space 59, which is concentric to the piston rod duct in the cylinder end piece 7 and which, as a component of the pressure chamber 17, is adjacent to the annular space 23. An annular piston 61 is disposed as an accumulator piston in the accumulator piston formed by the annular space 59. As in the preceding example, the annular piston 61 is preloaded by a compression spring 58, which is supported on a retaining ring 57.

The embodiments according to FIGS. 5, 5A and 5B are examples, in which the supply device for the supply of oil pressure to the oil pressure chamber 33 is provided with a monitoring device for the oil supply. In this regard, FIG. 5A shows a mechanical solution, in which the accumulator piston 55 of the piston accumulator 51 is provided with a measuring rod 63, which is guided outward by an oil seal 65 and indicates the position of the accumulator piston 55 and therefore the size of the oil supply in the piston accumulator 51.

By contrast, FIG. 5B shows a solution in which a pressure sensor 67 indicates the oil pressure in the oil side 39 of the piston accumulator 51. In the event that there is no oil supply on the oil side 39, the pressure indicated will be equal to zero. The zero indicator may also indicate that there is no gas pressure in the cylinder tube 1. To ensure that the monitoring of the oil supply is unambiguous, a second pressure sensor 69 can also monitor the gas pressure in the annular space 23 to compare this pressure value with the value indicated by the first pressure sensor 67.

FIGS. 6 and 7 show an additional embodiment, in which the guide component 19 located at the end 15 of the piston rod 9 is triangular in shape and is only guided on the inside of the cylinder tube 1 at the corner regions 71 of that piston rod. Sliding members 73 may be provided at the corner regions 71 of the guide component 19 for such a sliding guide. The sliding members are guided in guide grooves 75, which are incorporated into the wall of the cylinder tube 1. Alternatively, guide rails 77 may be provided on the wall of the cylinder tube 1 to guide the guide component 19 of the piston rod 9.

The following embodiments are only explained insofar as they differ from the embodiments described above. In so doing, for the most part the same reference numerals that were used above will be used for the same components. In this respect, the explanations given above shall also apply to the embodiments described below.

Thus the gas cylinder solution according to FIG. 8 differs from the embodiment according to FIG. 1 in that the piston rod 9 does not have a guide component in the form of a piston head. Instead, in this embodiment, the outer circumference of the free end of the piston rod 9 is guided via the ring seal 14 along the inner circumference of the cylinder tube 1 in a sealing manner. Such ring seal 14 is disposed in the end region of the piston rod 9 at the height of the end 15 thereof.

A technical solution of this kind creates a very large accumulator space, formed by the hollow cylindrical recesses within the cylinder tube 1 and the piston rod 9. Other working media, preferably in a gaseous form, may be used instead of the nitrogen working gas, such as noble gases, to be able to optimally adjust the working and storage capacity of the gas cylinder to the given application situation.

Figure 9:
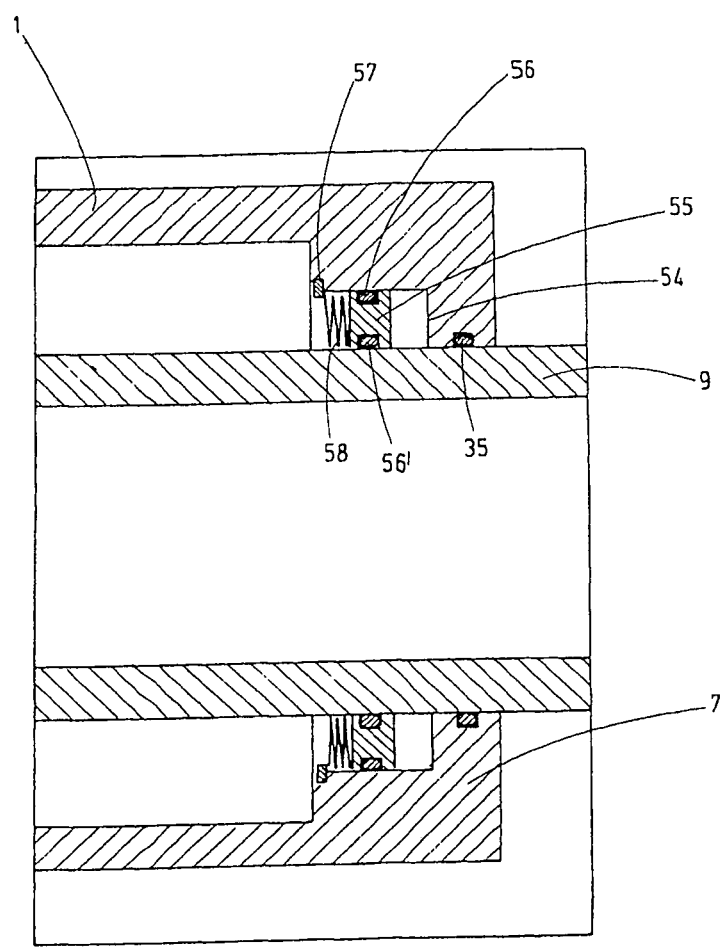
FIG. 9 is a partial side view in section of a sealing solution for a gas cylinder, in which, the annular piston rests directly on the outer circumference of the hollow cylindrical piston rod.

The embodiment according to FIG. 9 essentially corresponds to the embodiments according to FIGS. 3 and 3A, with the stipulation that the annular accumulator piston 55 is inserted into a circumferential recess 54 of the cylinder tube 1, and the outer and inner circumference of the piston are sealed. An outer ring seal 56 of the accumulator piston 55 is supported on the inner circumference of the circumferential recess 54 in the form of a hollow cylindrical annular groove. The additional sealing ring member 56', extending along the inner circumferential side, is supported on the cylindrical outer wall of the piston rod 9.

The embodiment according to FIG. 10, on the other hand, corresponds to the illustration according to FIGS. 1 and 1A, with the stipulation that valve units 78 at least partially replace the ducts 21. Such valve components 78 in the guide component 19, which forms a kind of piston head, preferably comprise an adjustable choke or gate 80. A spring-loaded non-return valve 82 connected in parallel may be used here. The direction of opening of valve 82 may optionally be oriented towards the interior of the cylinder tube or the interior of the hollow cylindrical piston rod 9. In the different embodiments according to FIG. 10 shown, the gas or fluid flows between the aforementioned chambers, thus between the chamber 23 and the interior of the piston rod 9, can be controlled by the throttle valve and/or non-return valve 80, 82.

In the case of the embodiment according to FIG. 11, which is essentially based on the embodiments shown in FIGS. 5, 5A and 5B, an ultrasound measuring head 90 serves to determine the respective displacement position of the accumulator piston 55 within the recess of the of the cylindrical guide tube 1. Instead of the ultrasonic sensor 90, which can be electrically connected to a voltage source and/or evaluation unit, other position sensing systems (not shown) may be used for the accumulator piston 55.

As made clear by the preceding embodiments, the force-stroke characteristic of the gas cylinder can be adjusted in particular by the selection of the outer and inner diameter of the piston rod 9 and the inner diameter of the cylinder tube 1.

While various embodiments have been chosen to illustrate the invention, it will be understood by those skilled in the art that various changes and modifications can be made therein without departing from the scope of the invention as defined in the claims.

The invention claimed is:

1. A gas cylinder, comprising:
a cylinder tube having a pressurized gas chamber therein and having a longitudinal axis;
a piston rod extending along said longitudinal axis, through a wall of said cylinder tube and into said pressurized chamber, said piston rod being hollow and including a straight length of tubing, an inner end of said tubing being open to said pressurized gas chamber of said cylinder tube;
a seal between said cylinder tube and said piston rod and sealing gas pressure in said pressure gas chamber against ambient pressure with said piston rod extending through said seal, said seal including first and second sealing rings located in first and second annular grooves, respectively, and including a pressurized oil chamber being a third annular groove between said first and second sealing rings, said first sealing ring being adjacent said pressurized gas chamber, said second sealing ring being further away from said pressurized gas chamber than said first sealing ring, said first, second and third annular grooves being coaxial to one another, being formed in an end piece of said cylinder tube, being axially offset and spaced from one another along said longitudinal axis and encircling said piston rod with said first and second sealing rings being separated from said pressurized oil chamber, each of said first, second and third annular grooves having a first end surface proximate to said pressurized gas chamber and having a second end surface remote from said pressurized gas chamber, each of said first and second end surfaces extending radially relative to said longitudinal axis with the first and second end surfaces of the respective annular groove facing one another and defining the respective annular groove therebetween, said second end surface of said first annular groove being axially spaced along said longitudinal axis from said first end surface of said third annular groove by a first fixed portion of said cylinder tube, said second end surface of said third annular groove being axially spaced along said longitudinal axis from said first end surface of said second annular groove by a second fixed portion of said cylinder tube; and
a supply device compressing sealing oil in said pressurized oil chamber to a pressure at least as high as pressure of the gas pressure in said pressurized gas chamber of said cylinder tube, said supply device including a hydraulic accumulator having an oil side containing said sealing oil and connected to said pressurized oil chamber in fluid communication by a connection, said hydraulic accumulator having a gas side connected in fluid communication with said pressurized gas chamber of said cylinder tube.

2. The gas cylinder according to claim 1 wherein said piston rod comprises a movable sliding element in said cylinder tube.

3. The gas cylinder according to claim 1 wherein said first and second sealing rings and said pressurized oil chamber are in fixed positions relative to one another.

4. The gas cylinder according to claim 1 wherein said supply device comprises an oil connection allowing refilling of said sealing oil in said oil side of said hydraulic accumulator.

5. The gas cylinder according to claim 1 wherein said supply device comprises a quantity of sealing oil sensor.

6. The gas cylinder according to claim 1 wherein said supply device comprises a pressure sensor.

7. The gas cylinder according to claim 1 wherein said hydraulic accumulator is a piston accumulator.

8. The gas cylinder according to claim 7 wherein a piston of said piston accumulator is mechanically preloaded for movement towards said oil side.

9. The gas cylinder according to claim 7 wherein said piston accumulator is in said end piece with said gas side of said piston accumulator opening into said pressurized gas chamber of said cylinder tube.

10. The gas cylinder according to claim 9 wherein said piston accumulator comprises an accumulator cylinder formed in said end piece by an annular space adjacent to said pressurized gas chamber, said annular space enclosing said piston rod and containing an annular piston.

11. The gas cylinder according to claim 10 wherein said annular space has a longitudinal axis coaxial with said longitudinal axis of said cylinder tube; and
said annular piston movable in said annular space along and coaxial with said longitudinal axes.

12. The gas cylinder according to claim 7 wherein said piston accumulator has an accumulator cylinder formed in said end piece by an annular space coaxial with a longitudinal axis of said cylinder tube and having an annular piston coaxial with the longitudinal axis of said cylinder tube.

13. The gas cylinder according to claim 1 wherein said piston rod comprises a piston-shaped guide component slidably received in said cylinder tube and being located at an end of said piston rod.

14. The gas cylinder according to claim 13 wherein said guide component comprises a non-circular periphery; and
an inside wall of said cylinder tube comprises sliding guides along corners of said cylinder tube engaging said non-circular periphery.

15. The gas cylinder according to claim 1 wherein force-stroke characteristics of the gas cylinder are determined by selection of inner and outer diameters of said piston rod and an inner diameter of said cylinder tube.

16. The gas cylinder according to claim 1 wherein said pressurized gas chamber is in fluid communication with said gas side of said hydraulic accumulator in all positions of said piston rod in said cylinder tube.

17. The gas cylinder according to claim 1 wherein said pressurized gas chamber is in direct fluid communication with said gas side of said hydraulic accumulator.

18. The gas cylinder according to claim 1 wherein said first and second sealing rings are elastomeric.

19. The gas cylinder according to claim 1 wherein a bearing eye is provided on each of an end of said cylinder tube remote from said end piece and an end of said piston rod located outside of said cylinder tube.

20. The gas cylinder according to claim 1 wherein said piston rod comprises a guide component on an end of said piston rod located in and contacting said cylinder tube, said guide component having a duct therein providing fluid communication between said pressurized gas chamber and an annular space between an outside surface of said piston rod and an inside surface of said cylinder tube.

* * * * *